April 14, 1925. 1,533,243
E. GALTERIO
BANDIT TRAP
Filed March 17, 1924 2 Sheets-Sheet 1
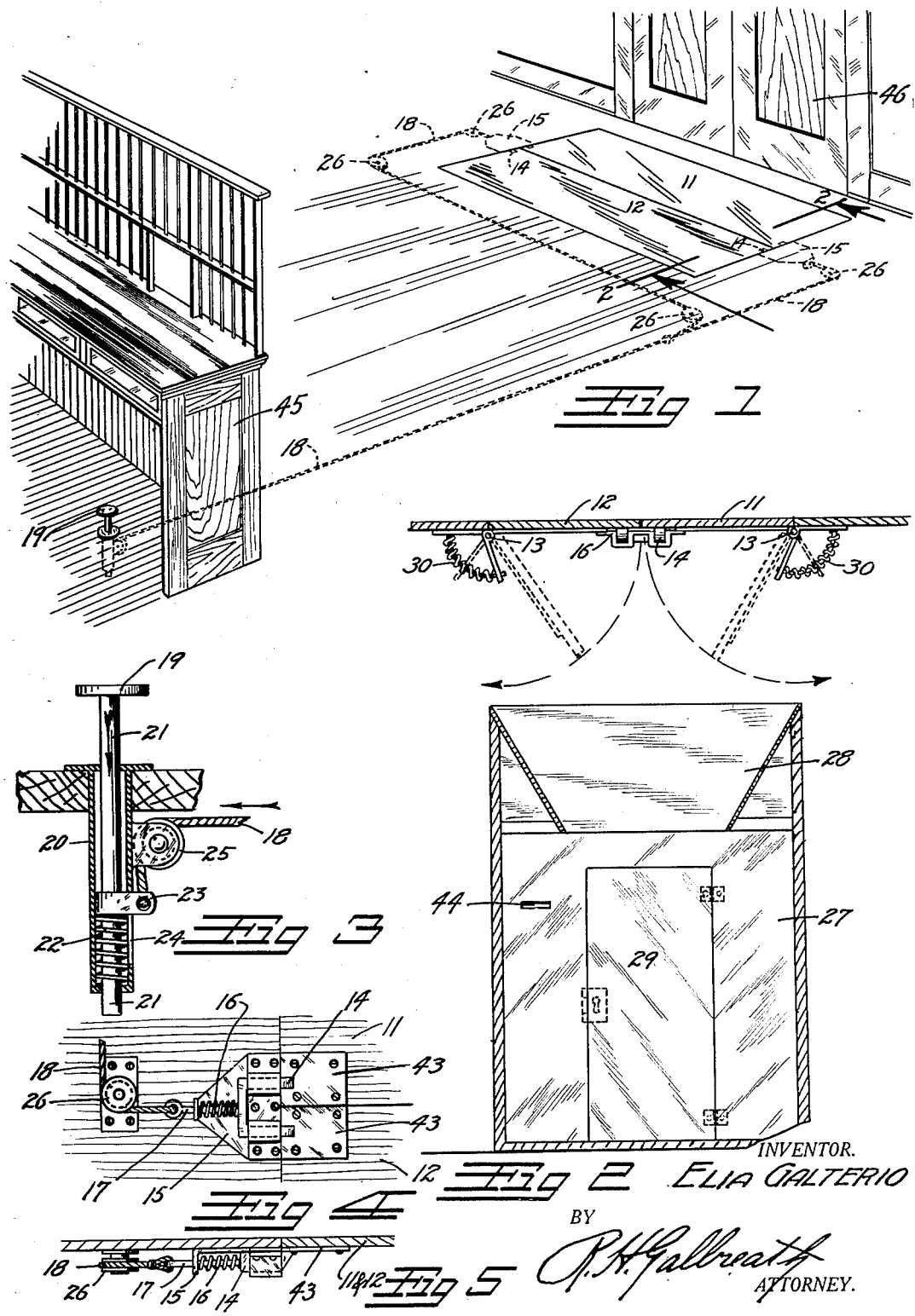
INVENTOR.
ELIA GALTERIO
BY
P. H. Galbreath
ATTORNEY.

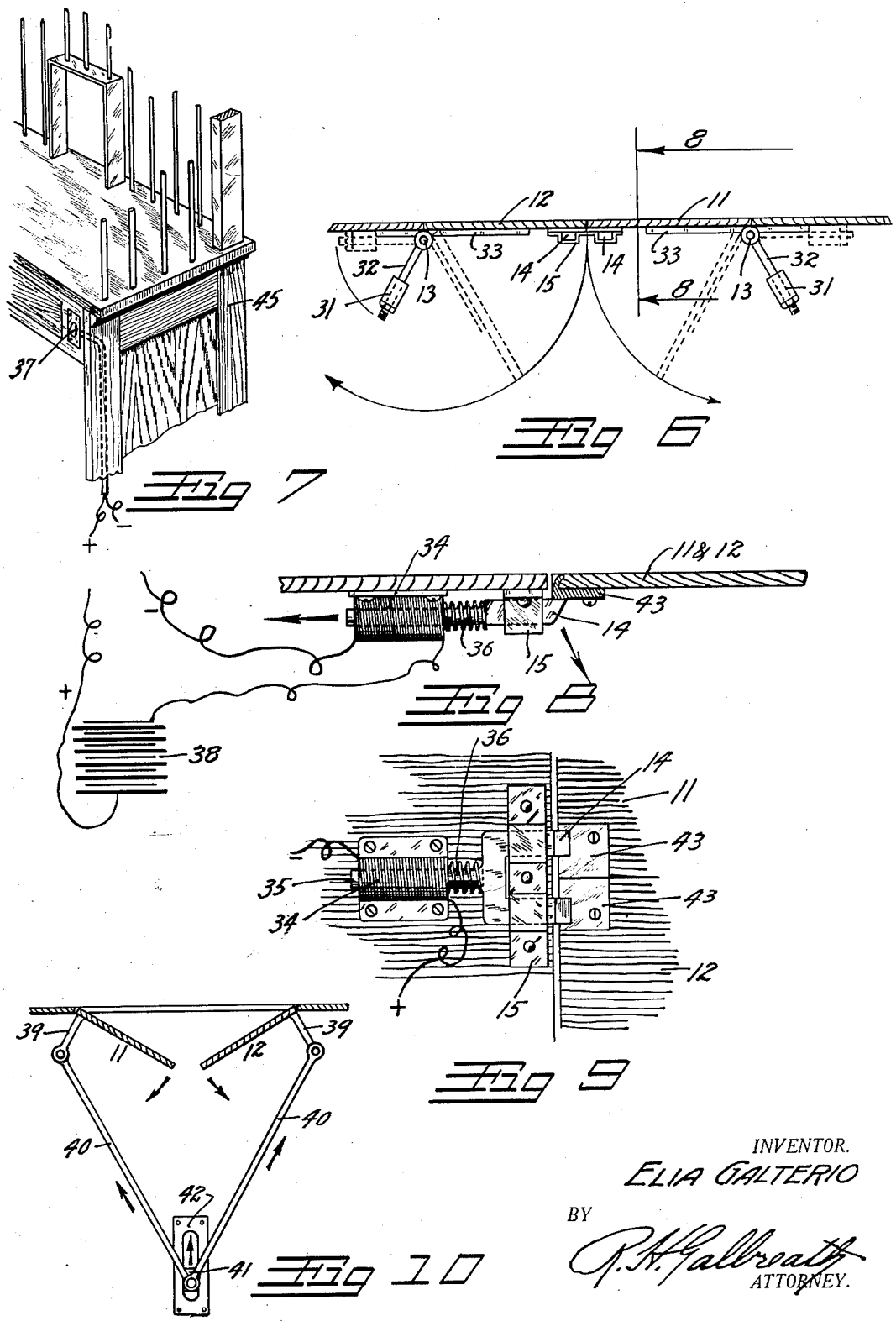

Patented Apr. 14, 1925.

1,533,243

UNITED STATES PATENT OFFICE.

ELIA GALTERIO, OF DENVER, COLORADO.

BANDIT TRAP.

Application filed March 17, 1924. Serial No. 699,774.

*To all whom it may concern:*

Be it known that I, ELIA GALTERIO, a citizen of the United States of America, residing at Denver, in the county of Denver and State of Colorado, have invented certain new and useful Improvements in Bandit Traps, of which the following is a specification.

This invention relates to traps particularly designed for entrapping bandits, holdups, burglars etc. and preventing their escape from a store or bank after an attempted robbery.

The principal object of the invention is to provide a simple and positive operating mechanism for a device of this character.

Another object of the invention is to provide means for imprisoning the victim after he has been trapped.

Still another object of the invention is to provide means whereby the trap may be operated from a number of convenient locations.

A further object of the invention is to provide means for causing the two doors of the trap to operate simultaneously.

Other objects and advantages reside in the detail construction of the invention, which result in simplicity, economy, and efficiency, and which will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view showing the device installed at the doorway of a building.

Fig. 2 is a cross-section through the device taken on the line 2—2 Fig. 1.

Fig. 3 is a detail view of the foot tread which is used when the trap is mechanically operated.

Fig. 4 is a plan view looking upward, of the latch mechanism of the mechanically operated trap.

Fig. 5 is a side elevation of the latch mechanism shown in Fig. 4.

Fig. 6 is a cross-section through the doors of the trap illustrating the use of counterweights in place of springs for returning the doors to their normal position.

Fig. 7 illustrates one of the operating stations of the trap when electrically operated.

Fig. 8 is a cross-section illustrating the latch used for electrical operation.

Fig. 9 is a plan view, looking upward, of the electrical latch.

Fig. 10 is a diagrammatic view illustrating a method for causing the two doors of the trap to operate simultaneously.

The invention comprises two co-acting trap doors 11 and 12 which may be placed at any desired point in the floor, such as in front of the cashier's cage or at the doorway. The doors 11 and 12 are each hinged at their one side as shown at 13 and are supported at their contacting or free sides upon the extremities of U shaped latch bolts 14. One of the latch bolts 14 is placed at each end of the doors 11 and 12.

The bolts 14 are carried in a suitable plate 15 and are provided with springs 16 which constantly tend to force them outward into contact with the doors. A rod 17 is secured to each of the latch bolts 14 and passes through the spring 16 terminating in an eyelet to which is secured a cable, chain, or other flexible device 18.

The bolts 14 are operated by means of one or more foot treads 19 located in the floor at convenient points. The foot treads comprise a tube 20 which projects through the floor as shown in Fig. 3. A rod 21 supports the foot tread 19 and passes through the tube 20. A spring 22 is positioned in the bottom of the tube 20 and acts to support the foot tread 19 through the medium of a lug 23 which is secured to the rod 21 and projects through a slot 24 in the tube 20. A pulley 25 is affixed to one side of the tube 20.

The cables 18 are trained around suitable idler pulleys 26 and over the pulley 25 and are secured to the lugs 23.

It can be readily seen that any downward movement of the foot tread 19 will draw on the cables 18 and withdraw the latch bolts 14 from contact with the doors 11 and 12 allowing the weight of a person standing upon the doors to force them downward.

A box 27 is positioned immediately below the doors 11 and 12. The box 27 is open at its top and is provided with a smooth surfaced hopper 28 to direct the bandit therein and a door 29 through which he may be removed. Since the surface of the hopper 28 is perfectly smooth it will be impossible for the bandit to climb from the box 27. A peep hole 44 is provided in the box 27 through which the bandit may be viewed and through which demands may be made for him to drop his gun.

After the bandit has passed through the doors 11 and 12 they are returned to the closed position through the medium of springs 30. The ends of the latches 14 are beveled, as shown in Fig. 5, to allow the upward passage of the doors and the springs 16 act to snap the latch bolts 14 in place under the returned doors.

Counterweights 31, as shown in Fig. 6, may be used in place of the springs 30 and are perhaps more desirable for the reason that their action will be unimpaired by age. The counterweights 31 are carried on arms 32 which are secured to the movable side 33 of the hinges.

Should it be desired to electrically operate the doors a solenoid 34 is used to withdraw the latch bolts 14. The latch bolts being provided with a projecting rod 35 which serves as an armature for the solenoids. Springs 36 are provided to return the latch bolts after the circuit in the solenoids has been broken. Push buttons 37, located at convenient points, are used to complete the circuits to the solenoids 34 from a battery 38 or other source of power.

In order to insure both doors operating, even though the bandit should be standing upon but one of them, the doors may be provided with arms 39 connected by means of connecting rods 40 to a cross head 41 slidably mounted in a vertical slide 42. It will be seen that by means of this arrangement any movement of one of the doors will be communicated to the other. Bearing plates 43 are secured to the doors 11 and 12 at the points of contact with the latch bolts 14 to prevent wear. In use, the doors could be concealed by a small rug if desired.

In those establishments where the bandit would have to stand in one location in order to get the money, such as, before the window of a cashier's cage, the trap doors are placed in this position. In other establishments, having several widely distributed cash registers, the trap doors are made relatively large and placed immediately inside of the entrance so as to trap the bandit as he attempts to leave the building.

While specific forms of the invention have been described and illustrated herein, it is desired and understood that the same may be varied, within the scope of the appended claims, without departing from the spirit of the invention.

Having thus described the invention, what I claim and desire secured by Letters Patent is:—

1. In a trap, comprising a pair of hinged trap-doors and slidable, spring-returned, latch bolts for releasing said doors, means for operating said latch bolts comprising a tube arranged to be placed in and extend below the floor; a vertical rod extending through said tube and carrying a lug which projects through a slot in said tube; a spring compressed between said lug and the bottom of said tube and a connection between said lug and said latch bolts.

2. In a trap, comprising a pair of hinged trap-doors and slidable, spring-returned, latch bolts for releasing said doors, means for operating said latch bolts comprising a solenoid surrounding a stem on said bolts and a spring acting against said solenoid.

3. A trap comprising a pair of hinged trap doors, means for releasing said doors; a lever secured to each of said doors; a connecting rod secured to each of said levers and a vertically slidable cross head secured to one extremity of each of said levers.

In testimony whereof, I affix my signature.

ELIA GALTERIO.